Figure 1:
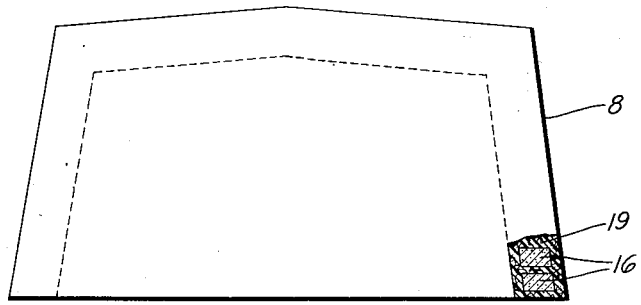

Nov. 6, 1956  E. H. THOMPSON  2,769,202
MOLDING APPARATUS
Filed July 10, 1953

INVENTOR.
Earl H. Thompson
BY George Sipkin
Paul N. Ritcher
ATTORNEYS

United States Patent Office 2,769,202
Patented Nov. 6, 1956

2,769,202

MOLDING APPARATUS

Earl H. Thompson, Port Orchard, Wash.

Application July 10, 1953, Serial No. 367,375

4 Claims. (Cl. 18—34)

(Granted under Title 35, U. S. Code (1952), sec. 266)

This invention may be manufactured and used by or for the Government of the United States of America for governmental purposes without the payment of any royalties thereon or therefor.

This invention relates to molding apparatus and, more particularly, to a mold for making articles of resin-impregnated materials.

It is a common practice in the molding of resinous articles to impregnate a base or filler material for reinforcing or otherwise modifying the physical characteristics of the molded article. When a liquid resin is to be injected or formed in a mold having such a material filling a substantial portion of the mold cavity, the flow of the resin is retarded by the resistance of the material, and, unless the liquid resin flows under extremely high pressure, or the article is very small in size, the material cannot be completely impregnated. It has been found that the distribution of the liquid resin can be accelerated by forming a permanent trough on the inside surface of the mold which permits an unrestricted flow of the resin throughout the sections of the mold. Although the trough facilitated the passage of the resin flow throughout the mold, there were inherent disadvantages in this type of construction. The permanent trough increases the size of the mold cavity and, therefore, requires the use of more resin for each article. Further, this surplus resin solidified in the trough and formed a projection on the finished article which, in most instances, had to be removed from the article by chipping or other machining operations. Another disadvantage of the permanent trough occurs in the use of certain types of liquid resins, such as the polyester resins, when the large mass of resin hardening in the trough generates heat which cracks the molded article.

Accordingly, an important object of this invention is to provide a molding apparatus with a disappearing trough for displacing the liquid molding material in the trough throughout the mold cavity prior to solidification.

Another important object is to provide a molding apparatus with means for lifting the molded article from the mold.

The objects of the invention are accomplished by providing apparatus for molding flowable material, such as liquid resin, in which the mold is formed with a flexible wall portion. Pressure means are provided to move the flexible wall portion outwardly of the mold cavity to form a recess for the passage of the flowable material to facilitate distribution throughout the cavity, which is most desirable when a base material, such as a fibrous material, is to be impregnated. The means is capable of restoring the flexible wall portion to its original position at the final stage of mold filling to re-form the mold cavity and distribute the flowable material in the recess throughout the cavity whereby to fill any voids that may be present in the mold cavity. If desired, the flexible wall portion can be projected into the mold cavity by the application of additional pressure to lift the article from the mold. In the preferred embodiment the means for moving the flexible wall portion consists of fluid pressure which is admitted into a chamber or trough formed on the outer side of the flexible wall portion.

Figure 2:
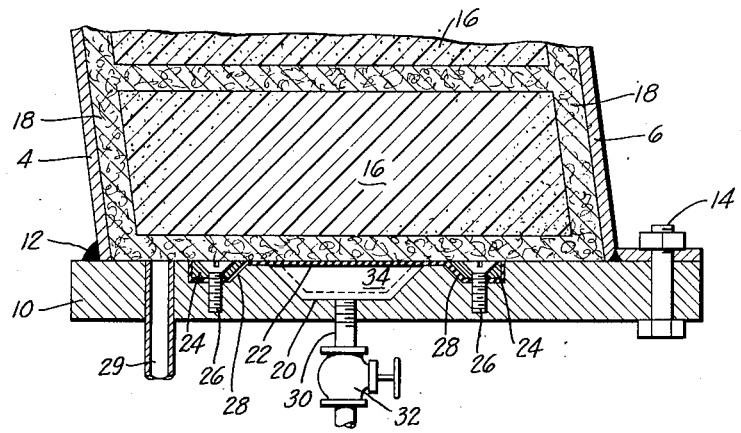

The preferred embodiment of the invention is illustrated in the drawings in which Fig. 1 is an end view of a molded boat hull in an inverted molding position with a portion of the hull cross-sectioned to show the internal structure. Fig. 2 an enlarged view of the cross-sectioned portion in Fig. 1 showing a corresponding section of the molding apparatus prior to the injection of the molding material, and Fig. 3 a similar view showing a modification of the molding apparatus.

In the drawing, the molding apparatus in Fig. 2 comprises a pair of mating male and female molds 4 and 6, which in their entirety conform to the inner and outer surfaces of a boat hull 8 (Fig. 1), the mold being spaced apart a distance depending on the desired thickness of the hull. A base mold member 10 closes the open lower end of the mold and may be permanently secured to one of the male or female molds and detachably connected to the other mold to permit separation of the mold parts. In the preferred embodiment the hull is molded in an inverted position, and the base member 10 is welded at 12 to male mole 4 to form a fixed support for the molding apparatus. The base member is connected by bolts 14 to the female mold to permit the female mold to be detached and lifted from the male mold for the removal of the molded boat hull upon the completion of the molding process.

It has been found desirable in the molding of boats from resinous material to incorporate a buoyancy material in the hull, such as is represented by the "styrofoam" blocks 16. These blocks may be precut according to the configuration of the hull and wrapped with a fibrous material 18, which may comprise layers of glass fiber cloth having one or more intermediate layers of glass fiber material. The glass fibers are impregnated by the resinous material, indicated at 19 in Fig. 1, and serve to strengthen the molded article. It is apparent that the glass fibers or other fibrous material can be used independently of the buoyancy material.

The present invention is not limited to the use of any particular type of molding material. However, in the molding of resinous articles, it is preferred that the resin be injected into the mold in a molten state, or, most desirably, in a natural liquid state. One resinous material which has been found satisfactory in practice is a liquid polyester resin formed of styrene, which resin can be mixed with a suitable catalyst prior to injection into the mold to accelerate hardening in the mold. As the buoyancy material and fibrous material occupy a substantial portion of the mold cavity, a permanent trough may be formed in one of the mold members to provide an additional passageway in the mold cavity for the flow of the resinous material and to facilitate impregnation of the fibrous material throughout the mold. Such a trough 20 is illustrated in Fig. 2 and may be formed in base member 10. However, in order to avoid the disadvantages of a permanent trough a flexible member or diaphragm 22 is positioned over trough 20 and separate the trough from the remaining mold cavity, the diaphragm being movable to form a disappearing passageway or trough in a manner later to be described. The diaphragm can be sealed along its longitudinal edges by hold-down strips 24 secured by screws 26 in slots 28 in base member 10 to form a normally flat inner mold surface which will form the gunwale of the boat hull. The diaphragm can be constructed of a sheet of elastic material such as rubber, as illustrated, or of a non-elastic material, such as sheet metal corrugated to increase its flexibility. The liquid resin is introduced into the mold cavity through sprue tube 29 which is connected to the mold cavity at a point laterally spaced from the diaphragm. A low pressure of 5 to 10 pounds per square inch has been found to be sufficient to force the resin into the mold cavity.

In the preferred embodiment the diaphragm is flexed by means of air pressure from a conventional source, not shown, connected to trough 20 through a pipe 30 having a valve 32 to regulate the introduction of vacuum or a pressure higher than atmospheric pressure, depending on the direction the diaphragm is to be flexed. As the resin is injected into the mold cavity through sprue tube 29 at the start of the molding operation, trough 20 is evacuated through pipe 30 and the reduced pressure draws the diaphragm from its normally free position into contact with the surfaces of the trough, illustrated in Fig. 2 in dashed lines, to create a passageway or trough 34 for the flow of the liquid resin, which passageway may conform substantially to the shape of the trough. It is obvious that such conformity is not necessary as long as a trough-like passageway is created by the diaphragm of sufficient size to permit the relatively unrestricted flow of liquid resin throughout the mold cavity.

When the mold is completely filled with the liquid resin, or nearly so, the vacuum to trough 20 is cut off and in its stead air pressure is introduced into the trough to force the diaphragm back to its normal position which causes passageway 34 to disappear. This outward movement of the diaphragm displaces the resin in the passageway and forces it into contact with the mold walls and into the voids between fibrous material positioned adjacent the mold walls and between the blocks of buoyancy material to obtain a more uniform article.

When the resin has set and the mold uncovered by removal of female mold 6, additional air pressure can be introduced into the trough to flex the diaphragm upwardly beyond the normal position and into the mold cavity to lift and release the hull from the mold. In practice, a pressure of 7 pounds per square inch has been found capable of lifting a molded hull weighing 6000 pounds. A trough of sufficient size is, therefore, not only desirable to insure a wide path for the resin flow throughout the mold, but also to insure a large diaphragm area for lifting the molded hull without distortion even though the resin has not completely hardened, thus expediting the molding operation. In this manner the flexible diaphragm has the additional function of a jack for lifting the article from the mold.

Figure 3:
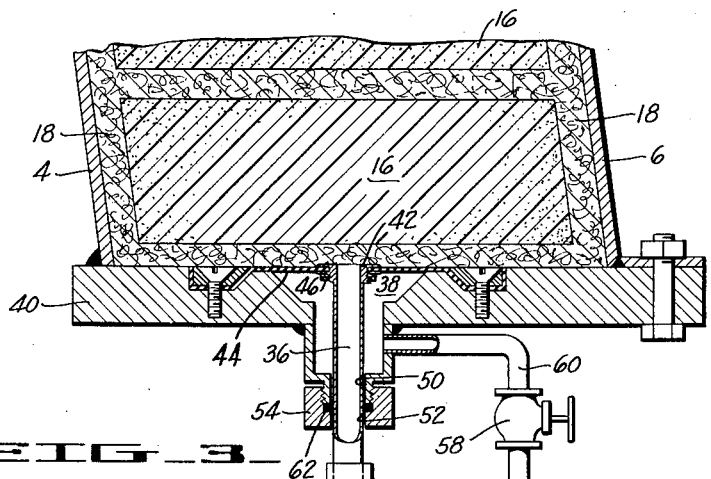

The modification of the molding apparatus in Fig. 3 differs from the apparatus in Fig. 2 in that the resin is injected directly into the disappearing passageway of the mold cavity through the diaphragm. Referring to the details, the sprue tube 36 extends vertically through the trough 38 in the base member 40, the upper end of the sprue tube being secured within a central opening 42 in the diaphragm 44 by a lock nut 46 which clamps the diaphragm against a sprue tube shoulder. The lower end of the sprue tube extends freely through openings 50 and 52 in base member 40 and packing nut 54 and is connected to a flexible supply hose 56. As the diaphragm is flexed by the admission of vacuum or air pressure into trough 38 through control valve 58 and pipe 60, the sprue tube is reciprocated through the base member and this movement is sealed by the packing 62. The operation of the molding apparatus in Fig. 3 is substantially the same as the apparatus in Fig. 2 previously described.

According to the invention, a mold is provided with a flexible diaphragm which will form a disappearing trough or passageway in the mold cavity. This passageway is particularly desirable when a strengthening or buoyancy material is to be impregnated in the mold as the passageway provides an additional path of sufficient size for the low pressure flow of the molding material during filling to insure distribution throughout the mold cavity, and which passageway may be made to disappear after filling of the mold to displace the molding material remaining in the passageway. The flexible diaphragm is preferably actuated by fluid pressure to eliminate any mechanical operating connection to the diaphragm, which most likely would be required to extend for the entire length of the diaphragm. When fluid pressure is used to operate the diaphragm, a trough may be formed exteriorly of the diaphragm to form a sealed chamber with the diaphragm and to form a base against which the flexible member may be drawn by the fluid presure. The disappearing trough can be conveniently used as a jack by the application of additional pressure on the diaphragm to lift and release the molded article from the mold.

I claim:

1. Apparatus for molding flowable material comprising male and female molds one of which is formed with a trough, a flexible member covering said trough and forming with the other of said molds a portion of the mold cavity, means supported on the flexible member for introducing the molding material through said trough, and fluid pressure means for drawing said flexible member into said trough to provide an additional passageway for the material and for displacing said flexible member from said trough surfaces to re-form the mold cavity and distribute said material in the trough throughout the cavity.

2. Apparatus for molding flowable material comprising male and female molds, a base member closing the ends of the mold and having a trough, a flexible member secured to the base member for covering said trough and forming with said molds a portion of the mold cavity, an injection tube extending through said trough and movably supported by the flexible member for introducing the molding material to the cavity, and fluid pressure means connected to the trough for drawing said flexible member into contact with the trough surfaces to provide an additional passageway for the material and for displacing said flexible member from said trough surfaces to re-form the mold cavity and distribute said material throughout the cavity, said fluid means being operable to exert a mold-releasing pressure on the flexible member.

3. Apparatus for molding flowable material comprising male and female molds adapted when mated to form a mold cavity, a recess provided in one of said molds, a diaphragm covering said recess and forming a part of said mold cavity, pressure reducing means communicating with the interior of said recess beneath said diaphragm, and sprue means communicating with said mold cavity for feeding material into the cavity and over said diaphragm, said pressure-reducing means being operable during said feed for drawing said diaphragm into said recess for forming an expanded mold cavity.

4. Apparatus for molding flowable material comprising male and female molds adapted when mated to form a mold cavity, a recess provided in one of said molds, a diaphragm covering said recess and forming a part of said mold cavity, pressure reducing means communicating with the interior of said recess beneath said diaphragm, sprue means communicating with said mold cavity for feeding material into the cavity and over said diaphragm, said pressure-reducing means being operable during said feed for drawing said diaphragm into said recess for forming an expanded mold cavity, and pressure means communicating with the interiors of said recess beneath said diaphragm for reforming the original mold-cavity and for exerting a mold-releasing pressure on the diaphragm.

References Cited in the file of this patent

UNITED STATES PATENTS

| | | |
|---|---|---|
| 2,101,015 | Anderson | Dec. 7, 1937 |
| 2,666,230 | Sherman | Jan. 19, 1954 |